June 18, 1929.  A. P. BRUSH  1,717,873
JOURNAL BEARING
Filed Jan. 7, 1924
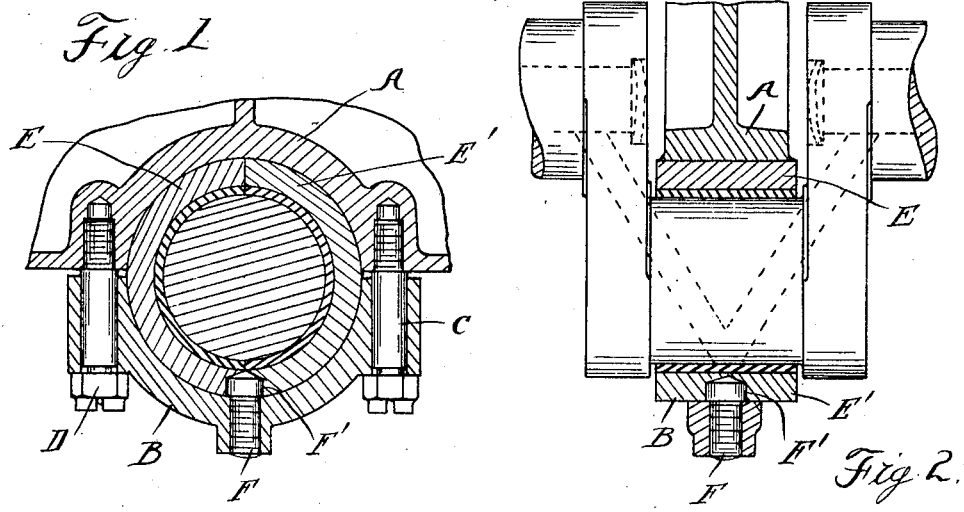
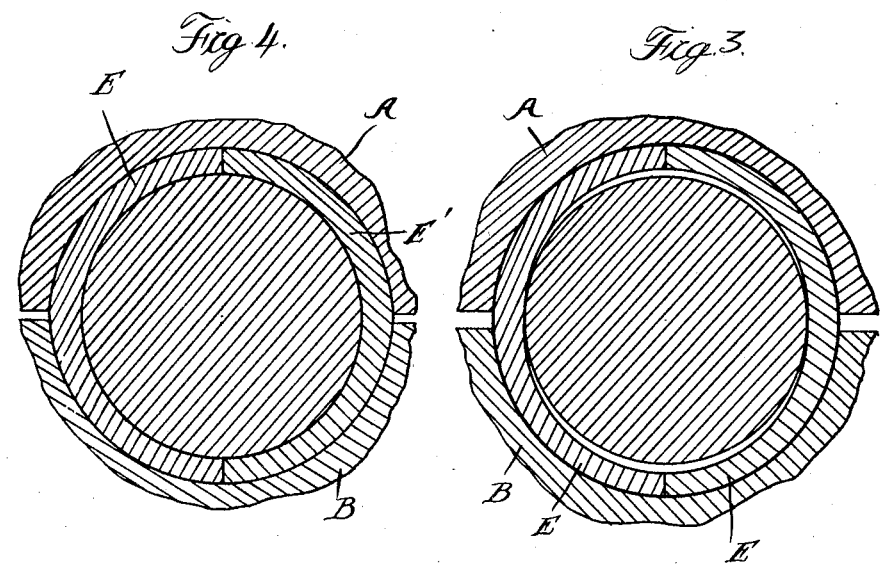
Inventor
Alanson P. Brush
By Whittemore Hulbert Whittemore
+Belknap   Attorneys Patented June 18, 1929.

1,717,873

UNITED STATES PATENT OFFICE.

ALANSON P. BRUSH, OF DETROIT, MICHIGAN.

JOURNAL BEARING.

Application filed January 7, 1924. Serial No. 684,879.

The invention relates to journal bearings and consists in the novel construction as hereinafter set forth.

In the drawings:

Figure 1 is a cross section through the bearing;

Figure 2 is a longitudinal section therethrough;

Figures 3 and 4 are diagrams showing the manner of adjusting the bearing to compensate for wear.

In the construction of journal bearings it is common to form the same in half sections to permit of readily engaging or disengaging the shaft. Where the bearing is also provided with a split bushing, the sections thereof are respectively engaged with the sections of the outer bearing so that the plane of division is the same for both outer bearing and bushing. With such constructions it is further necessary to provide means for anchoring the bushing sections within the bearing sections to prevent relative displacement, and it is also necessary to provide means for securing the detachable section or cap to the fixed body of the bearing so as to hold these parts properly aligned.

With my improved construction I have separated the plane of division of the bushing sections from that of the outer bearing sections, preferably by arranging said planes at right angles to each other. When so arranged the bushing sections bridge the gap between the outer bearing sections and the outer bearing sections bridge the gap between the bushing sections so as to hold all of said sections properly aligned. Such an arrangement further permits of anchoring the bushing sections by a single detent arranged in the plane of division therebetween and by placing this detent in the removable cap section, both bushing sections may be readily detached from the bearing when the cap is removed without the necessity of removing the shaft. Other advantages of the construction will be hereinafter referred to more specifically.

As shown in Figures 1 and 2, A is the fixed outer bearing section and B the removable cap section therefor which may be secured to each other in any suitable manner, such as by the studs C and nuts D. E and E' are bushing sections, which are arranged within the sections A and B, but with their plane of division perpendicular to the plane of division between the fixed bearing and cap. F is a pin or other anchoring detent for holding the bushing sections E and E' from displacement, said detent being arranged in the plane of division between the sections and preferably secured to the cap section B.

With the construction as described, in assembling the parts the bushing sections E and E' may first be placed within the fixed bearing A and the cap B then engaged therewith. In the latter operation the detent F will be engaged with notches F' in the meeting faces of the two bushing sections, which will hold said sections from displacement either longitudinally or rotatively. In case the shaft is held in position the bushing sections may still be readily engaged with the fixed bearing by first engaging them successively with the exposed portion of the shaft and then rotating to arrange the plane of division at right angles to that of the outer bearing.

When the bushing becomes worn, adjustment may be made either by removing shims from between the abutting ends of the bushing or by cutting away these ends to provide clearance. The cap B may then be adjusted towards the main bearing through the medium of the nuts D on the studs C and this will bend the end portions of the bushing into conformity to the shaft as shown in Figure 4. It is not essential to provide any means for holding the cap in accurate alignment during such adjustment, as the bridging portions of the bushing will accomplish this purpose.

What I claim as my invention is:

In a journal bearing, the combination with a stationary bearing section having a semi-cylindrical recess, a removable cap having a complementary semi-cylindrical recess, and means for detachably securing said cap to said bearing section on opposite sides of the cylindrical recess formed by the co-operation of said bearing section and cap, of a bushing formed in two half sections each having concentric semi-cylindrical outer and inner surfaces, said bushing being arranged within said cylindrical recess to have the plane of division between the sections perpendicular to the plane of division of the bearing and cap, and anchoring means carried by said cap engaging both of said half sections in the plane of division therebetween to normally prevent rotation of said sections with the journal, said sections being however freely rotatable when the cap is removed to permit of successive detachment from said bearing.

In testimony whereof I affix my signature.

ALANSON P. BRUSH.